United States Patent
Zhang et al.

(10) Patent No.: US 11,361,879 B2
(45) Date of Patent: Jun. 14, 2022

(54) MOISTURE CURABLE COMPOSITION FOR WIRE AND CABLE INSULATION AND JACKET LAYERS

(71) Applicants: Dow Global Technologies LLC, Midland, MI (US); Rohm and Haas Company, Collegeville, PA (US); Dow Silicones Corporation, Midland, MI (US)

(72) Inventors: Yichi Zhang, Collegeville, PA (US); Xindi Yu, Phoenixville, PA (US); Bharat I. Chaudhary, Princeton, NJ (US); Gerald Lawrence Witucki, Midland, MI (US)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 80 days.

(21) Appl. No.: 16/632,692

(22) PCT Filed: Jul. 31, 2018

(86) PCT No.: PCT/US2018/044496
§ 371 (c)(1),
(2) Date: Jan. 21, 2020

(87) PCT Pub. No.: WO2019/027955
PCT Pub. Date: Feb. 7, 2019

(65) Prior Publication Data
US 2020/0152347 A1 May 14, 2020

Related U.S. Application Data

(60) Provisional application No. 62/538,940, filed on Jul. 31, 2017.

(51) Int. Cl.
| | | |
|---|---|---|
| H01B 3/47 | (2006.01) |
| H01B 3/44 | (2006.01) |
| C09D 7/61 | (2018.01) |
| C09D 5/18 | (2006.01) |
| C09D 123/26 | (2006.01) |
| H01B 3/00 | (2006.01) |
| H01B 3/46 | (2006.01) |
| H01B 7/295 | (2006.01) |

(52) U.S. Cl.
CPC ............... *H01B 3/441* (2013.01); *C09D 5/18* (2013.01); *C09D 7/61* (2018.01); *C09D 123/26* (2013.01); *H01B 3/002* (2013.01); *H01B 3/46* (2013.01); *H01B 7/295* (2013.01)

(58) Field of Classification Search
CPC ........................................................ H01B 3/47
See application file for complete search history.

(56) References Cited

U.S. PATENT DOCUMENTS

| | | | |
|---|---|---|---|
| 3,225,018 A | 12/1965 | Zutty | |
| 4,500,648 A | 2/1985 | Malpass | |
| 4,574,133 A | 3/1986 | Umpleby | |
| 5,741,858 A | 4/1998 | Brann et al. | |
| 5,986,028 A | 11/1999 | Lai et al. | |
| 6,011,105 A | 1/2000 | Ota et al. | |
| 6,051,642 A | 4/2000 | Tkaczyk et al. | |
| 8,618,207 B2 | 12/2013 | Sultan et al. | |
| 8,871,843 B2 | 10/2014 | Lee | |
| 9,249,288 B2 | 2/2016 | Andreasson et al. | |
| 10,811,163 B2 | 10/2020 | Perego et al. | |
| 2008/0019898 A1* | 1/2008 | Dromard ............ H01M 50/409 |
| | | | 423/339 |
| 2009/0221203 A1 | 9/2009 | Nosker et al. | |
| 2010/0273926 A1 | 10/2010 | Robinson | |
| 2011/0100674 A1 | 5/2011 | Pagliuca et al. | |
| 2012/0178868 A1 | 7/2012 | Esseghir et al. | |
| 2013/0161060 A1 | 6/2013 | Ponce Ibarra et al. | |
| 2014/0141240 A1 | 5/2014 | Segawa et al. | |
| 2015/0200038 A1 | 7/2015 | Esseghir et al. | |

FOREIGN PATENT DOCUMENTS

| | | |
|---|---|---|
| EA | 13847 B1 | 8/2010 |
| GB | 1284082 | 8/1972 |
| JP | 201221607 | 2/2012 |
| JP | 2015072743 | 4/2015 |

(Continued)

OTHER PUBLICATIONS

Williams, T., et al., "The Construction of a Polyethylene Calibration Curve for Gel Permeation Chromatography Using Polystyrene Fractions," Polymer Letters, 1968, p. 621-624, vol. 6.
Randall, James C., "A Review of High Resolution Liquid Carbon Nuclear Magnetic Resonance Characterizations of Ethylene-Based Polymers," Rev. Macromol. Chem. Phys., 1989, p. 285-297, vol. C29, No. 2 & 3.
Sultan, Bernt-Ake, et. al., "A New Technology Platform for Moisture Curable Non Halogen Flame Retardant Polyolefin," International Wire & Cable Symposium, p. 731-742, 64th IWCS Conference.

*Primary Examiner* — Chau N Nguyen

(57) ABSTRACT

An insulation or jacket layer for a coated conductor is composed of (A) a crosslinked silane-functional polyolefin, (B) a filler composed of greater than 50 wt % silica, based on the total weight of the filler, (C) a silicone-containing polymer selected from the group consisting of reactive linear silicone-containing polymers, non-reactive linear silicone-containing polymers, and non-reactive branched silicone-containing polymers, and (D) from 0.00 wt % to 20 wt % of a silanol condensation catalyst, based on the total weight of the insulation or jacket layer.

17 Claims, No Drawings

(56) References Cited

FOREIGN PATENT DOCUMENTS

| | | |
|---|---|---|
| RU | 2530779 C2 | 10/2014 |
| RU | 2547011 C2 | 4/2015 |
| WO | 2016176034 | 11/2016 |

\* cited by examiner

MOISTURE CURABLE COMPOSITION FOR WIRE AND CABLE INSULATION AND JACKET LAYERS

FIELD OF THE DISCLOSURE

This disclosure relates to moisture curable compositions. In one aspect, the disclosure relates to moisture curable compositions with high wet electrical insulation resistance and flame retardancy, while in another aspect, the disclosure relates to insulation or jacket layers for wires and cables comprising a moisture curable composition and coated conductors including the same.

BACKGROUND

Moisture-curable compositions containing a silane-functionalized polyolefin (e.g., a silane-grafted polyolefin) are frequently used to form coatings, and particularly insulation or jacket layers, for wires and cables. To improve the flame retardancy of the compositions, a flame retardant filler or combination of fillers is added. Flame retardant filler compounds generally decompose at elevated temperatures to release or absorb heat. For example, metal hydrates and other halogen-free flame retardant fillers release inert gas and absorb energy via an endothermic decomposition reaction when exposed to high temperatures. However, flame retardant compositions using such halogen-free filler compounds which decompose at elevated temperatures tend to have low wet electrical insulation resistance.

Silica has also been considered as a flame retardant filler. However, because silica does not undergo an endothermic decomposition reaction, silica is generally used only in minor amounts. Consequently, the art recognizes the need for flame retardant compositions that use silica as a primary flame retardant filler in moisture curable compositions.

SUMMARY

The disclosure provides a crosslinkable composition for an insulation or jacket layer for a coated conductor. In an embodiment, the crosslinkable composition comprises (A) a crosslinked silane-functionalized polyolefin; (B) a filler comprising greater than 50 wt % silica, based on the total weight of the filler; (C) a silicone-containing polymer selected from the group consisting of reactive linear silicone-containing polymers, non-reactive linear silicone-containing polymers, and non-reactive branched silicone-containing polymers; and (D) from 0.00 wt % to 20 wt % of a silanol condensation catalyst, based on the total weight of the crosslinkable composition.

In another embodiment, the disclosure provides an insulation or jacket layer for a coated conductor. In an embodiment, the insulation or jacket layer comprises (A) a crosslinked silane-functionalized polyolefin; (B) a filler comprising greater than 50 wt % silica, based on the total weight of the filler; (C) a silicone-containing polymer selected from the group consisting of reactive linear silicone-containing polymers, non-reactive linear silicone-containing polymers, and non-reactive branched silicone-containing polymers; and (D) from 0.00 wt % to 20 wt % of a silanol condensation catalyst, based on the total weight of the insulation layer.

In another embodiment, the disclosure provides a coated conductor. In an embodiment, the coated conductor comprises a conductor, and a coating on the conductor, the coating comprising (A) a crosslinked silane-functionalized polyolefin, (B) a filler comprising greater than 50 wt % silica, based on the total weight of the filler, (C) a silicone-containing polymer selected from the group consisting of reactive linear silicone-containing polymers, non-reactive linear silicone-containing polymers, and non-reactive branched silicone-containing polymers, and (D) from 0.00 wt % to 20 wt % of a silanol condensation catalyst, based on the total weight of the coating.

Definitions and Test Methods

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure and all test methods are current as of the filing date of this disclosure.

"Alkyl" and "alkyl group" refer to a saturated linear, cyclic, or branched hydrocarbon group. "Aryl group" refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. In particular embodiments, aryls have between 1 and 200 carbon atoms, between 1 and 50 carbon atoms or between 1 and 20 carbon atoms.

"Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, preferably of 3 to 20 carbon atoms, in some cases preferably of 4 to 10 carbon atoms and in other cases preferably of 4 to 8 carbon atoms. Nonlimiting examples of α-olefins from which the elastomers are prepared include ethylene, propylene, 1-butene, 1-pentene, 1-hexene, 1-octene, 1-dodecene, and mixtures of two or more of these monomers.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations. Blends are not laminates, but one or more layers of a laminate may contain a blend.

"Carboxylate" refers to a salt or ester of carboxylic acid.

"Composition," as used herein, includes a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed. The term "or," unless stated otherwise, refers to the listed members individual as well as in any combination. Use of the singular includes use of the plural and vice versa.

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will effectuate substantial crosslinking upon subjection or exposure to such treatment (e.g., exposure to water).

"Crosslinked" and similar terms mean that the polymer composition, before or after it is shaped into an article, has xylene or decalin extractables of less than or equal to 90 weight percent (i.e., greater than or equal to 10 weight percent gel content).

"Cured" and like terms means that the polymer, before or after it is shaped into an article, was subjected or exposed to a treatment which induced crosslinking.

Density is measured in accordance with ASTM D792, Method B. The result is recorded in grams (g) per cubic centimeter (g/cc or g/cm$^3$).

Dynamic viscosity is a fluid's resistance to shearing flows and is reported in Pa·s (pascal seconds), mPa·s (millipascal seconds) or MPa·s (megapascal seconds). Shear viscosity is calculated by $\eta=\tau/\dot{\gamma}$ wherein $\eta$ is the shear viscosity measured in Pascal·seconds, $\tau$ is the shear stress measured in Pascal, and $\dot{\gamma}$ is the shear rate, measured in reciprocal seconds. For purposes of this disclosure, the dynamic viscosity is measured in accordance with ASTM D445.

An "ethylene/α-olefin polymer" is a polymer that contains a majority amount of polymerized ethylene, based on the weight of the polymer, and one or more α-olefin comonomers.

An "ethylene-based polymer," "ethylene polymer," or "polyethylene" is a polymer that contains equal to or greater than 50 wt %, or a majority amount of polymerized ethylene based on the weight of the polymer, and, optionally, may comprise one or more comonomers. Suitable comonomers include, but are not limited to) alpha-olefins and unsaturated esters. Suitable unsaturated esters include alkyl acyrlates, alkyl methacrylates, and vinyl carboxylates. Suitable nonlimiting examples of acrylates and methacrylates include ethyl acrylate, methyl acrylate, methyl methacrylate, t-butyl acrylate, n-butyl acrylate, n-butyl methacrylate, and 2 ethylhexyl acrylate. Suitable nonlimiting examples of vinyl carboxylates include vinyl acetate, vinyl propionate, and vinyl butanoate. The generic term "ethylene-based polymer" thus includes ethylene homopolymer and ethylene interpolymer. "Ethylene-based polymer" and the term "polyethylene" are used interchangeably. Non-limiting examples of ethylene-based polymer (polyethylene) include low density polyethylene (LDPE) and linear polyethylene. Non-limiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. Polyethylene may also be produced in a high pressure reactor without a catalyst.

"Functional group" and like terms refer to a moiety or group of atoms responsible for giving a particular compound its characteristic reactions. Non-limiting examples of functional groups include heteroatom-containing moieties, oxygen-containing moieties (e.g., alcohol, aldehyde, ester, ether, ketone, and peroxide groups), and nitrogen-containing moieties (e.g., amide, amine, azo, imide, imine, nitrate, nitrile, and nitrite groups).

The horizontal burn test is administered according to UL-2556. A burner is set at a 20° angle relative to horizontal of the sample (14 AWG copper wire with 30 mil polymer layer/wall thickness). A one-time flame is applied to the middle of the specimen for 30 seconds. The sample fails when either the cotton ignites (reported in seconds) or the char length is in excess of 100 mm.

"Hydrolysable silane group" and like terms mean a silane group that will react with water. These include alkoxysilane groups on monomers or polymers that can hydrolyze to yield silanol groups, which in turn can condense to crosslink the monomers or polymers.

"Interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

Kinematic viscosity is the ratio of the shear viscosity to the density of a fluid and is reported in St (stokes) or cSt (centistokes). For purposes of this specification, kinematic viscosity is measured at 40° C. using a Brookfield viscometer in accordance with ASTM D445 or.

Median particle size, or D50, is the particle diameter at which 50% of the particles have a diameter less than or equal to D50 and 50% of the particles have a diameter greater than D50.

Melt index (MI) measurement for polyethylene is performed according to ASTM D1238, Condition 190° C./2.16 kilogram (kg) weight, formerly known as "Condition E" and also known as $I_2$, and is reported in grams eluted per 10 minutes.

"Metals" includes all elements listed as metals in the Periodic Table of Elements, including Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, La, Hf, Ta, W, Re, Os, Ir, Pt, Au, Hg, Tl, Pb, Bi, Po, Fr, Ra, Ac, Rf, db, Sg, Bh, Hs, Mt, Ds, Rg, and Cn, as well as the lanthanides and actinides.

"Metal-free", a "metal-free filler" or a "metal-free composition" is a filler or composition containing from 0 wt %, or greater than 0 wt %, or 0.05 wt %, or 0.1 wt % to less than 0.15 wt %, or less than 0.2 wt %, or less than 0.3 wt %, or less than 0.4 wt %, or less than 0.5 wt % metals by weight.

"Moisture curable" and like terms indicate that the composition will cure, i.e., crosslink, upon exposure to water. Moisture cure can be with or without the assistance of a crosslinking catalyst (e.g., a silanol condensation catalyst), promoter, etc.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin comonomers. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Polyolefin" and like terms mean a polymer derived from simple olefin monomers, e.g., ethylene, propylene, 1-butene, 1-hexene, 1-octene and the like. The olefin monomers can be substituted or unsubstituted and if substituted, the substituents can vary widely.

A "propylene-based polymer," "propylene polymer," or "polypropylene" is a polymer that contains equal to or greater than 50 wt %, or a majority amount of polymerized propylene based on the weight of the polymer, and, optionally, may comprise one or more comonomers. The generic term "propylene-based polymer" thus includes propylene homopolymer and propylene interpolymer.

"Room temperature" means 25° C.+/−4° C.

A "sheath" is a generic term and when used in relation to cables, it includes insulation coverings or layers, jacket layers and the like.

Specific gravity is the ratio of the density of a substance to the density of a standard. In the case of a liquid, the standard is water. Specific gravity is a dimensionless quantity and is measured in accordance with ASTM D1298.

The weight average molecular weight (Mw) is defined as weight average molecular weight of polymer, and the number average molecular weight (Mn) is defined as number average molecular weight of polymer. The polydispersity index is measured according to the following technique: The polymers are analyzed by gel permeation chromatography (GPC) on a Waters 150° C. high temperature chromatographic unit equipped with three linear mixed bed columns (Polymer Laboratories (10 micron particle size)), operating at a system temperature of 140° C. The solvent is 1,2,4-trichlorobenzene from which about 0.5% by weight solutions of the samples are prepared for injection. The flow rate is 1.0 milliliter/minute (mm/min) and the injection size is 100 microliters (µL). The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968, incorporated herein by reference) to derive the equation:

$$M\text{polyethylene}=(a)(M\text{polystyrene})^b$$

In this equation, a=0.4316 and b=1.0.

Weight average molecular weight, Mw, is calculated in the usual manner according to the formula:

$$Mw=E(w_i)(M_i)$$

in which wi and Mi are the weight fraction and molecular weight respectively of the ith fraction eluting from the GPC column. Generally the Mw of the ethylene polymer ranges from 42,000 to 64,000, preferably 44,000, to 61,000, and more preferably 46,000 to 55,000.

Wet insulation resistance (IR) is typically conducted on a coiled moisture cured coated conductor (14 AWG copper wire with 30 mil polymer layer/wall thickness) of which 10 ft (3.048 meter) lengths of wires were immersed in an electrical water bath at 90° C. The wires are connected to a megohmmeter in a manner such that the water is one electrode and the wire conductor is the other one. In that manner, the direct current (DC) electrical resistance of the insulation layer is measured with 500 V applied. The initial measurement is taken after 6-24 hr of submersion, and all subsequent measurements are taken on a 7-day frequency for a period of typically up to 12 weeks, while the sample is aged under 600 V alternating current (AC). If, before weeks 10-12, the average resistance measured for 10 ft long wire is below 1000 MOhms, the specimens are deemed to have failed the test and labeled as "Fail". For those specimens that exhibit higher resistance than 1000 MOhms before weeks 10-12, the wet insulation resistance ratio is computed by dividing the average IR recorded in weeks 10-12 by the average IR recorded in weeks 6-8.

A "wire" is a single strand of conductive metal, e.g., copper or aluminum, or a single strand of optical fiber.

DETAILED DESCRIPTION

In an embodiment, the disclosure provides a crosslinkable composition for use as a jacket layer for a coated conductor. As used herein, "jacket layer" encompasses insulation layer. In an embodiment, the jacket layer is an insulation layer.

In an embodiment, the disclosure provides a crosslinkable composition for an insulation or jacket layer for a coated conductor, the crosslinkable composition comprising (A) a silane-functionalized polyolefin, (B) a filler comprising greater than 50 wt % silica, based on the total weight of the filler, (C) a silicone-containing polymer, and (D) from 0.00 wt % to 20 wt % of a silanol condensation catalyst, based on the total weight of the crosslinkable composition.

In an embodiment, the disclosure provides an insulation or jacket layer for a coated conductor comprising (A) a crosslinked silane-functionalized polyolefin, (B) a filler comprising greater than 50 wt % silica, based on the total weight of the filler, (C) a silicone-containing polymer, and (D) from 0.00 wt % to 20 wt % of a silanol condensation catalyst, based on the total weight of the insulation or jacket layer.

(A) Silane-Functionalized Polyolefin

The crosslinkable composition includes a silane-functionalized polyolefin.

In an embodiment, the silane-functionalized polyolefin contains from 0.1 wt %, or 0.3 wt %, or 0.5 wt %, or 0.8 wt %, or 1.0 wt %, or 1.2 wt %, or 1.5 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt % silane, based on the total weight of the silane-functionalized polyolefin.

In an embodiment, the silane-functionalized polyolefin has a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.930 g/cc, or 0.940 g/cc, or 0.950 g/cc or 0.960 g/cc, or 0.965 g/cc, as measured by ASTM D-792.

In an embodiment, the silane-functionalized polyolefin is an alpha-olefin/silane copolymer or a silane-grafted polyolefin (Si-g-PO).

An alpha-olefin/silane copolymer is formed by the copolymerization of an alpha-olefin (such as ethylene) and a hydrolysable silane monomer (such as a vinyl silane monomer). In an embodiment, the alpha-olefin/silane copolymer in an ethylene/silane copolymer prepared by the copolymerization of ethylene, a hydrolysable silane monomer and, optionally, an unsaturated ester. The preparation of ethylene/silane copolymers is described, for example, in U.S. Pat. Nos. 3,225,018 and 4,574,133, each incorporated herein by reference.

A silane-grafted polyolefin (Si-g-PO) is formed by grafting a hydrolysable silane monomer (such as a vinyl silane monomer) onto the backbone of a base polyolefin (such as polyethylene). In an embodiment, grafting takes place in the presence of a free-radical generator, such as a peroxide. The hydrolysable silane monomer can be grafted to the backbone of the base polyolefin prior to incorporating or compounding the Si-g-PO into a final article or simultaneously with the extrusion of composition to form a final article. For example, in an embodiment, the Si-g-PO is formed before the Si-g-PO is compounded with (B) filler, (C) silicone-containing polymer, (D) silanol condensation catalyst, and other optional components. In another embodiment, the Si-g-PO is formed by compounding a polyolefin, hydrolysable silane monomer and drafting catalyst/co-agent along with the (B) filler, (C) silicone-containing polymer, (D) silanol condensation catalyst, and other optional components.

The base polyolefin for a Si-g-PO may be an ethylene-based or propylene-based polymer. In an embodiment, the base polyolefin is an ethylene-based polymer, resulting in a silane-grafted ethylene-based polymer (Si-g-PE). Non-limiting examples of suitable ethylene-based polymers include ethylene homopolymers and ethylene interpolymers containing one or more polymerizable comonomers, such as an unsaturated ester and/or an alpha-olefin.

The hydrolysable silane monomer used to make an alpha-olefin/silane copolymer or a Si-g-PO is a silane-containing monomer that will effectively copolymerize with an alpha-olefin (e.g., ethylene) to form an alpha-olefin/silane copolymer (e.g., an ethylene/silane copolymer) or graft to and crosslink an alpha-olefin polymer (e.g., a polyolefin) to form a Si-g-PO. Exemplary hydrolysable silane monomers are those having the following structure:

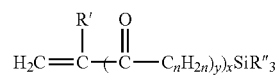

in which R' is a hydrogen atom or methyl group; x and y are 0 or 1 with the proviso that when x is 1, y is 1; n is an integer from 1 to 12 inclusive, preferably 1 to 4, and each R" independently is a hydrolysable organic group such as an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl.

Nonlimiting examples of suitable hydrolysable silane monomers include silanes that have an ethylenically unsaturated hydrocarbyl group, such as vinyl, allyl, isopropenyl, butenyl, cyclohexenyl or gamma-(meth)acryloxy allyl group, and a hydrolysable group, such as, for example, a hydrocarbyloxy, hydrocarbonyloxy, or hydrocarbylamino group. Examples of hydrolysable groups include methoxy, ethoxy, formyloxy, acetoxy, propionyloxy, and alkyl or arylamino groups.

In an embodiment, the hydrolysable silane monomer is an unsaturated alkoxy silane such as vinyl trimethoxy silane (VTMS), vinyl triethoxy silane, vinyl triacetoxy silane, gamma-(meth)acryloxy, propyl trimethoxy silane and mixtures of these silanes.

Nonlimiting examples of suitable unsaturated esters used to make an alpha-olefin/silane copolymer include alkyl acrylate, alkyl methacrylate, or vinyl carboxylate.

Nonlimiting examples of suitable alkyl groups include methyl, ethyl, n-propyl, i-propyl, n-butyl, t-butyl, etc. In an embodiment, the alkyl group has from 1, or 2 to 4, or 8 carbon atoms. Nonlimiting examples of suitable alkyl acrylates include ethyl acrylate, methyl acrylate, t-butyl acrylate, n-butyl acrylate, and 2-ethylhexyl acrylate. Nonlimiting examples of suitable alkyl methacrylates include methyl methacrylate and n-butyl methacrylate. In an embodiment, the carboxylate group has from 2 to 5, or 6, or 8 carbon atoms. Nonlimiting examples of suitable vinyl carboxylates include vinyl acetate, vinyl propionate, and vinyl butanoate.

In an embodiment, the silane-functionalized polyolefin is a silane-functionalized polyethylene. A "silane-functionalized polyethylene" is a polymer that contains silane and equal to or greater than 50 wt %, or a majority amount, of polymerized ethylene, based on the total weight of the polymer.

In an embodiment, the silane-functionalized polyethylene contains (i) from 50 wt %, or 55 wt %, or 60 wt %, or 65 wt %, or 70 wt %, or 80 wt %, or 90 wt %, or 95 wt % to 97 wt %, or 98 wt %, or 99 wt %, or less than 100 wt % ethylene and (ii) from 0.1 wt %, or 0.3 wt % or 0.5 wt %, or 0.8 wt %, or 1.0 wt %, or 1.2 wt %, or 1.5 wt % to 1.8 wt %, or 2.0 wt %, or 2.3 wt %, or 2.5 wt %, or 3.0 wt %, or 3.5 wt %, or 4.0 wt %, or 4.5 wt %, or 5.0 wt % silane, based on the total weight of the silane-functionalized polyethylene.

In an embodiment, the silane-functionalized polyethylene has a melt index (MI) from 0.1 g/10 min, or 0.5 g/10 min, or 1.0 g/10 min, or 2 g/10 min, or 3 g/10 min, or 5 g/10 min, or 8 g/10 min, or 10 g/10 min, or 15 g/10 min, or 20 g/10 min, or 25 g/10 min, or 30 g/10 min to 40 g/10 min, or 45 g/10 min, or 50 g/10 min, or 55 g/10 min, or 60 g/10 min, or 65 g/10 min, or 70 g/10 min, or 75 g/10 min, or 80 g/10 min, or 85 g/10 min, or 90 g/10 min, measured in accordance with ASTM D1238 (190° C./2.16 kg).

In an embodiment, the silane-functionalized polyethylene is an ethylene/silane copolymer.

In an embodiment, the ethylene/silane copolymer contains ethylene and the hydrolyzable silane monomer as the only monomeric units.

In an embodiment, the ethylene/silane copolymer optionally includes a $C_3$, or $C_4$ to $C_6$, or $C_8$, or $C_{10}$, or $C_{12}$, or $C_{16}$, or $C_{18}$, or $C_{20}$ α-olefin; an unsaturated ester; and combinations thereof. In an embodiment, the ethylene/silane copolymer is an ethylene/unsaturated ester/silane reactor copolymer.

Non-limiting examples of suitable ethylene/silane copolymers include SI-LINK™ DFDA-5451 NT and SI-LINK™ AC DFDB-5451 NT, each available from The Dow Chemical Company, Midland, Mich.

The ethylene/silane reactor copolymer may comprise two or more embodiments disclosed herein.

In an embodiment, the silane-functionalized polyethylene is a Si-g-PE. The base ethylene-based polymer for the Si-g-PE includes from 50 wt %, or 55 wt %, or 60 wt %, or 65 wt %, or 70 wt %, or 80 wt %, or 90 wt %, or 95 wt % to 97 wt %, or 98 wt %, or 99 wt %, or 100 wt % ethylene, based on the total weight of the base ethylene-based polymer.

In an embodiment, the base ethylene-based polymer for the Si-g-PE has a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.930 g/cc, or 0.940 g/cc, or 0.950 g/cc or 0.960 g/cc, or 0.965 g/cc, as measured by ASTM D-792.

In an embodiment, the base ethylene-based polymer for the Si-g-PE has a melt index (MI) from 0.1 g/10 min, or 0.5 g/10 min, or 1.0 g/10 min, or 2 g/10 min, or 3 g/10 min, or 5 g/10 min, or 8 g/10 min, or 10 g/10 min, or 15 g/10 min, or 20 g/10 min, or 25 g/10 min, or 30 g/10 min to 40 g/10 min, or 45 g/10 min, or 50 g/10 min, or 55 g/10 min, or 60 g/10 min, or 65 g/10 min, or 70 g/10 min, or 75 g/10 min, or 80 g/10 min, or 85 g/10 min, or 90 g/10 min, measured in accordance with ASTM D1238 (190° C./2.16 kg).

In an embodiment, the base ethylene-based polymer for the Si-g-PE is a homogeneous polymer. Homogeneous ethylene-based polymers have a polydispersity index (Mw/Mn or MWD) in the range of 1.5 to 3.5 and an essentially uniform comonomer distribution, and are characterized by a single and relatively low melting point as measured by a differential scanning calorimetry (DSC). Substantially linear ethylene copolymers (SLEP) are homogeneous ethylene-based polymers.

As here used, "substantially linear" means that the bulk polymer is substituted, on average, with from about 0.01 long-chain branches/1000 total carbons (including both backbone and branch carbons), or about 0.05 long-chain branches/1000 total carbons (including both backbone and branch carbons), or about 0.3 long-chain branches/1000 total carbons (including both backbone and branch carbons) to about 1 long-chain branch/1000 total carbons (including both backbone and branch carbons), or about 3 long-chain branches/1000 total carbons (including both backbone and branch carbons).

"Long-chain branches" or "long-chain branching" (LCB) means a chain length of at least one (1) carbon less than the number of carbons in the comonomer. For example, an ethylene/1-octene SLEP has backbones with long chain branches of at least seven (7) carbons in length and an ethylene/1-hexene SLEP has long chain branches of at least five (5) carbons in length. LCB can be identified by using 13C nuclear magnetic resonance (NMR) spectroscopy and to a limited extent, e.g. for ethylene homopolymers, it can be quantified using the method of Randall (Rev. Macromol. Chem. Phys., C29 (2&3). p. 285-297). U.S. Pat. No. 4,500,648 teaches that LCB frequency can be represented by the equation LCB=b/Mw in which b is the weight average number of LCB per molecule and Mw is the weight average molecular weight. The molecular weight averages and the LCB characteristics are determined by gel permeation chromatography (GPC) and intrinsic viscosity methods.

SLEPs and their method of preparation are more fully described in U.S. Pat. Nos. 5,741,858 and 5,986,028.

In an embodiment, the base ethylene-based polymer for the Si-g-PE is an ethylene/unsaturated ester copolymer. The unsaturated ester may be any unsaturated ester disclosed herein, such as ethyl acrylate. In an embodiment, the base ethylene-based polymer for the Si-g-PE is an ethylene/ethyl acrylate (EEA) copolymer.

In an embodiment, the base ethylene-based polymer for the Si-g-PE is an ethylene/α-olefin copolymer. The α-olefin contains from 3, or 4 to 6, or 8, or 10, or 12, or 16, or 18, or 20 carbon atoms. Non-limiting examples of suitable α-olefin include propylene, butene, hexene, and octene. In an embodiment, the ethylene-based copolymer is an ethylene/octene copolymer. When the ethylene-based copolymer is an ethylene/α-olefin copolymer, the Si-g-PO is a silane-grafted ethylene/α-olefin copolymer.

Non-limiting examples of suitable ethylene/alpha-olefin copolymers useful as the base ethylene-based polymer for the Si-g-PE include the ENGAGE™ and INFUSE™ resins available from the Dow Chemical Company.

In an embodiment, the silane-functionalized polyolefin is a silane-grafted ethylene/$C_4$-$C_8$ alpha-olefin polymer having one or both of the following properties:
  (i) a density from 0.850 g/cc, or 0.860 g/cc, or 0.875 g/cc, or 0.890 g/cc to 0.900 g/cc, or 0.910 g/cc, or 0.915 g/cc, or 0.920 g/cc, or 0.925 g/cc, or 0.930 g/cc, or 0.935 g/cc; and
  (ii) a melt index from 0.1 g/10 min, or 0.5 g/10 min, or 1.0 g/10 min, or 2 g/10 min, or 5 g/10 min, or 8 g/10 min, or 10 g/10 min, or 15 g/10 min, or 20 g/10 min, or 25 g/10 min, or 30 g/10 min to 30 g/10 min, or 35 g/10 min, or 45 g/10 min, or 50 g/10 min, or 55 g/10 min, or 60 g/10 min, or 65 g/10 min, or 70 g/10 min, or 75 g/10 min, or 80 g/10 min, or 85 g/10 min, or 90 g/10 min; In an embodiment, the silane-grafted ethylene-based polymer has both of properties (i)-(ii).

The silane-functionalized polyolefin is present in an amount from 10 wt %, or 20 wt %, or 30 wt %, or 40 wt %, or 50 wt % to 60 wt %, or 80 wt %, or 90 wt %, or 95 wt %, based on the total weight of the crosslinkable composition.

Blends of silane-functionalized polyolefins may also be used and the silane-functionalized polyolefin(s) may be diluted with one or more other polymers to the extent that the polymers are (i) miscible or compatible with one another, and (ii) the silane-functionalized polyolefin(s) constitutes from 70 wt %, or 75 wt %, or 80 wt %, or 85 wt %, or 90 wt %, or 95 wt %, or 98 wt %, or 99 wt % to less than 100 wt % of the blend.

The silane-functionalized polyolefin may comprise two or more embodiments disclosed herein.

(B) Filler

The crosslinkable composition includes a filler comprising greater than 50 wt % silica (silicon dioxide ($SiO_2$)), based on the total weight of the filler.

The silica can be natural silica or synthetic silica. Synthetic silica includes fumed silica, electric arc silica, fused silica, silica gel and precipitated silica.

In an embodiment, the silica has a median particle size (D50) of from 0.01 μm, or 0.1 μm, or 0.5 μm, or 1.0 μm, or 5.0 μm, or 10.0 μm to 20.0 μm, or 25.0 μm, or 30.0 μm, or 35.0 μm, or 40.0 or 45.0 μm, or 50.0 μm.

The silica may comprise two or more embodiments disclosed herein.

The silica may be the sole filler or the filler may include one or more additional fillers. In an embodiment, the filler includes one or more additional, or secondary, fillers in combination with the silica. Non-limiting examples of suitable secondary fillers include aluminum oxide (alumina, $Al_2O_3$), titanium oxide (titania, $TiO_2$), silicon carbide (SiC), glass particles, glass beads, plastic grits, quartz, coal fly ash, calcium carbonate, barium sulfate, carbon black, metal oxides, inorganic material, natural material, alumina trihydrate, alumina silicate, magnesium hydroxide, bauxite, talc, mica, barite, kaolin, post-consumer glass, post-industrial glass, synthetic and natural fiber, or any combination thereof.

In an embodiment, the filler comprises from greater than 50 wt %, or 60 wt %, or 70 wt %, or 80 wt %, or 90 wt %, or 95 wt %, or 96 wt %, or 97 wt %, or 98 wt % to 99 wt %, or 99.1 wt %, or 99.2 wt %, or 99.3 wt %, or 99.4 wt %, or 99.5 wt %, or 99.6 wt %, or 99.7 wt %, or 99.8 wt %, or 99.9 wt %, or less than 100 wt %, or 100 wt % silica based on the total weight of the filler.

In an embodiment, the silica is the sole filler. As the sole filler, the silica is the filler to the exclusion of any other filler. In a further embodiment, silica is the sole filler in the insulation or jacket layer to the exclusion of one, some or all of the following fillers: aluminum oxide (alumina, $Al_2O_3$), titanium oxide (titania, $TiO_2$), silicon carbide (SiC), glass particles, glass beads, plastic grits, quartz, coal fly ash, calcium carbonate, barium sulfate, carbon black, metal oxides, inorganic material, natural material, alumina trihydrate, alumina silicate, magnesium hydroxide, bauxite, talc, mica, barite, kaolin, post-consumer glass, post-industrial glass, and synthetic and natural fiber.

In an embodiment, silica is the sole filler and the filler is metal-free. The metal-free filler contains from 0 wt %, or greater than 0 wt %, or 0.05 wt %, or 0.1 wt % to 0.15 wt %, or 0.2 wt %, or 0.3 wt %, or 0.4 wt %, or 0.5 wt % metals, based on the total weight of the filler. As used herein, "metals" includes all elements listed as metals in the Periodic Table of Elements, including Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, La, Hf, Ta, W, Re, Os, Ir, Pt, Au, Hg, Tl, Pb, Bi, Po, Fr, Ra, Ac, Rf, db, Sg, Bh, Hs, Mt, Ds, Rg, and Cn, as well as the lanthanides and actinides.

In an embodiment, the filler is a blend of two or more fillers as described herein.

In an embodiment, the filler or blend of two or more fillers is present in an amount from 10 wt %, or 20 wt %, or 40 wt % to 50 wt %, or 60 wt %, or 70 wt %, or 80 wt %, or 90 wt %, based on the total weight of the crosslinkable composition.

The filler may comprise two or more embodiments disclosed herein.

(C) Silicone-Containing Polymer

The insulation or jacket layer includes a silicone-containing polymer selected from reactive linear silicone-containing polymers, non-reactive linear silicone-containing polymers, and/or non-reactive branched silicone-containing polymers. In an embodiment, the silicone-containing polymer is a reactive linear silicone-containing polymer or a non-reactive linear silicone-containing polymer.

The silicone-containing polymer has a density from 0.95 g/cc, or 0.96 g/cc, or 0.97 g/cc to 0.98 g/cc, or 0.99 g/cc, or 1.00 g/cc at 25° C.

If a liquid at room temperature, the silicone-containing polymer has a kinematic viscosity from 1 cSt, or 50 cSt, or 100 cSt, or 500 cSt, or 1,000 cSt, or 5,000 cSt, or 10,000 cSt to 15,000 cSt, or 25,000 cSt, or 50,000 cSt, or 75,000 cSt, or 1,000,000 cSt, or 5,000,000 cSt at 25° C.

In an embodiment, the silicone-containing polymer is a reactive linear silicone-containing polymer or non-reactive linear silicone-containing polymer.

In an embodiment, the silicone-containing polymer is a polysiloxane. A polysiloxane is a polymer having the general structure (I):

(Structure I)

where $R^2$ and $R^3$ are each hydrogen or an alkyl group with the proviso that, if the silicone-containing polymer is a linear polysiloxane, then both of $R^2$ and $R^3$ must be H or a methyl group.

In an embodiment, the polysiloxane is a linear polysiloxane having the general Structure I, wherein $R^2$ and $R^3$ are independently H or a methyl group. In an embodiment, the polysiloxane is a linear polysiloxane having the general Structure I, wherein $R^2$ and $R^3$ are each a methyl group.

In an embodiment, the linear polysiloxane may be reactive or non-reactive. A reactive linear polysiloxane includes at least one terminal functional group, i.e., a functional group on an end of the polymer. Nonlimiting examples of suitable functional groups include groups which can go through either hydrolysis or condensation reactions, such as hydroxysiloxy groups or alkoxysiloxy groups. A non-reactive linear polysiloxane has terminal alkyl or aromatic groups.

Nonlimiting examples of suitable linear polysiloxanes include linear polydimethylsiloxane (PDMS), linear poly(ethyl-methylsiloxane), and combinations thereof. A non-limiting example of a non-reactive linear polysiloxane is PMX-200, a polydimethylsiloxane polymer having terminal —Si(CH$_3$)$_3$ groups, available from Dow Corning. A non-limiting example of a reactive linear polysiloxane is XIAMETER® OHX-4000, a polydimethylsiloxane polymer having terminal silanol (e.g., —Si(CH$_3$)$_2$OH) functionality, available from Dow Corning.

In an embodiment, the polysiloxane is a branched polysiloxane having the general structure (II)

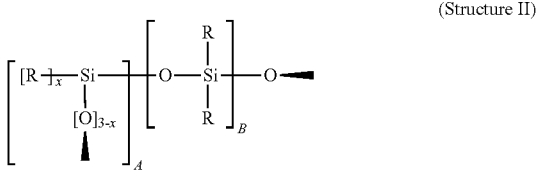
(Structure II)

wherein x is 0 or 1, each R is independently and alkyl group or aryl group having one or more carbon atoms, A is the molar ratio of crosslinked units and is greater than 0, B is the molar ratio of linear units and is greater than 0, and A+B is equal to 1.00. In Structure II above, each "wedge bond" or "" indicates a bond to a Si in another polysiloxane chain.

In an embodiment, the A:B ratio is from 1:99, or 5:95, or 25:75 to 95:5, or 97:3, or 99:1.

In an embodiment, the branched polysiloxane is a block polysiloxane having blocks of linear units and blocks of crosslinked units or a random polysiloxane having random equilibration distributions of the crosslinked units and linear units with a natural distribution of differing structures.

The branched polysiloxane is a non-reactive branched polysiloxane.

In an embodiment, the silicone-containing polymer is a mixture of two or more silicone-containing polymers as described herein. The mixture of two or more silicone-containing polymers is composed of from 0 wt %, or 5 wt %, or 10 wt %, or 20 wt %, or 30 wt %, or 40 wt % to 50 wt %, or 60 wt %, or 70 wt %, or 75 wt %, or 80 wt %, or 85 wt %, or 90 wt %, or 95 wt % of a linear polysiloxane which is (i) reactive, (ii) nonreactive, or (iii) a blend of both reactive and nonreactive linear polysiloxanes and from 10 wt %, or 15 wt %, or 20 wt %, or 25 wt %, or 30 wt %, or 40 wt %, or 50 wt % to 60 wt %, or 70 wt %, or 80 wt %, or 90 wt %, or 95 wt %, or 100 wt % of a non-reactive branched polysiloxane.

In an embodiment, the silicone-containing polymer or blend of silicone-containing polymers is present in an amount from greater than 2 wt %, or 3 wt %, or 4 wt %, or 4.25 wt %, or 4.5 wt %, or 4.75 wt % to 5 wt %, or 5.5 wt %, or 6 wt %, or 7 wt %, or 8 wt %, or 9 wt %, or 10 wt %, or 15 wt %, or 20 wt %, based on the total weight of the crosslinkable composition.

The silicone-containing polymer may comprise two or more embodiments disclosed herein.

(D) Silanol Condensation Catalyst

In an embodiment, the composition includes silanol condensation catalyst, such as Lewis and Brønsted acids and bases. A "silanol condensation catalyst" promotes crosslinking of the silane-functionalized polyolefin. Lewis acids are chemical species that can accept an electron pair from a Lewis base. Lewis bases are chemical species that can donate an electron pair to a Lewis acid. Non-limiting examples of suitable Lewis acids include the tin carboxylates such as dibutyltin dilaurate (DBTDL), dimethyl hydroxy tin oleate, dioctyl tin maleate, di-n-butyl tin maleate, dibutyltin diacetate, dibutyltin dioctoate, stannous acetate, stannous octoate, and various other organo-metal compounds such as lead naphthenate, zinc caprylate and cobalt naphthenate. Non-limiting examples of suitable Lewis bases include the primary, secondary and tertiary amines. Silanol condensation catalysts are typically used in moisture cure applications.

The silanol condensation catalyst is added to the crosslinkable composition during the cable manufacturing process. As such, the silane-functionalized polyolefin may experience some crosslinking before it leaves the extruder with the completion of the crosslinking after it has left the extruder upon exposure to humidity present in the environment in which it is stored, transported or used, although a majority of the crosslinking is delayed until exposure of the final composition to moisture (e.g., a sauna bath or a cooling bath)

In an embodiment, the silanol condensation catalyst is included in a catalyst masterbatch blend, and the catalyst masterbatch is included in the composition. The catalyst masterbatch includes the silanol condensation catalyst in one or more carrier resins. In an embodiment, the carrier resin is the same as the polyolefin resin which is functionalized with silane to become the silane-functionalized polyolefin or another polymer which is not reactive in the present composition. In an embodiment, the carrier resin is a blend of two or more such resins. Non-limiting examples of suitable carrier resins include polyolefin homopolymers (e.g., polypropylene homopolymer, polyethylene homopolymer), propylene/alpha-olefin polymers, and ethylene/alpha-olefin polymers.

Non-limiting examples of suitable catalyst masterbatch include those sold under the trade name SI-LINK™ from The Dow Chemical Company, including SI-LINK™ DFDA-5481 Natural and SI-LINK™ AC DFDA-5488 NT. SI-LINK™ DFDA-5481 Natural is a catalyst masterbatch containing a blend of 1-butene/ethene polymer, ethene homopolymer, phenolic compound antioxidant, dibutyltin dilaurate (DBTDL) (a silanol condensation catalyst), and a phenolic hydrazide compound. SI-LINK™ AC DFDA-5488 NT is a catalyst masterbatch containing a blend of a thermoplastic polymer, a phenolic compound antioxidant, and a hydrophobic acid catalyst (a silanol condensation catalyst).

In an embodiment, the silanol condensation catalyst is a blend of two or more silanol condensation catalysts as described herein.

In an embodiment, the silanol condensation catalyst or blend of two or more silanol condensation catalysts is present in an amount from 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, or 15 wt %, or 20 wt %, based on the total weight of the crosslinkable composition.

In an embodiment, the composition contains from 0.5 wt %, or 1.0 wt %, or 2.0 wt %, or 3.0 wt %, or 4.0 wt % to 5.0 wt % or 6.0 wt %, or 7.0 wt %, or 8.0 wt %, or 9.0 wt %, or 10.0 wt %, or 15.0 wt %, or 20.0 wt % catalyst masterbatch, based on total weight of the crosslinkable composition.

The silanol condensation catalyst may comprise two or more embodiments disclosed herein.

(E) Optional Additives

In an embodiment, the crosslinkable composition includes one or more optional additives. Non-limiting examples of suitable additives include metal deactivators, moisture scavengers, antioxidants, anti-blocking agents, stabilizing agents, colorants, ultra-violet (UV) absorbers or stabilizers (e.g., hindered amine light stabilizers (HALS) and titanium dioxide), other flame retardants, compatibilizers, fillers and processing aids. Nonlimiting examples of UV stabilizers include hindered.

Metal deactivators suppress the catalytic action of metal surfaces and traces of metallic minerals. Metal deactivators convert the traces of metal and metal surfaces into an inactive form, e.g., by sequestering. Non-limiting examples of suitable metal deactivators include 1,2-bis(3,5-di-tert-butyl-4-hydroxyhydrocinnamoyl)hydrazine, 2,2'-oxamindo bis[ethyl 3-(3,5-di-tert-butyl-4-hydroxyphenyl)propionate], and oxalyl bis(benzylidenehydrazide) (OABH). In an embodiment, the crosslinkable composition includes OABH. The metal deactivator is present in an amount from 0 wt %, or greater than 0 wt %, or 0.01 wt %, or 0.02 wt %, or 0.03 wt %, or 0.04 wt %, or 0.05 wt %, or 0.1 wt %, or 0.5 wt %, or 1 wt %, or 2 wt %, or 3 wt % to 5 wt %, or 6 wt %, or 7 wt %, or 8 wt %, or 9 wt % or 10 wt %, based on the total weight of the crosslinkable composition.

Moisture scavengers remove or deactivate unwanted water in the crosslinkable composition to prevent unwanted (premature) crosslinking and other water-initiated reactions in the crosslinkable composition. Non-limiting examples of moisture scavengers include organic compounds selected from ortho esters, acetals, ketals or silanes such as alkoxy silanes. In an embodiment, the moisture scavenger is an alkoxy silane. The moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt %, or 0.2 wt % to 0.3 wt %, or to 0.5 wt %, or to 0.75 wt %, or to 1.0 wt %, or to 1.5 wt %, or to 2.0 wt %, or to 3.0 wt %, based on the total weight of the crosslinkable composition.

"Antioxidant" refers to types or classes of chemical compounds that are capable of being used to minimize the oxidation that can occur during the processing of polymers. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityl tetrakis-3 (3,5-di-tert-butyl-4-hydroxyphenyl)-propionate; n-octadecyl-3 (3,5-di-tert-butyl-4-hydroxyphenyl)-propionate; 4,4'-methylenebis(2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate]. In an embodiment, the composition includes pentaerythritol tetrakis(3-(3,5-di-tert-butyl-4-hydroxyphenyl) propionate), commercially available as Irganox® 1010 from BASF. The antioxidant is present in an amount can from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1 wt %, or 2 wt %, based on the total weight of the crosslinkable composition.

Other optional additives, including anti-blocking agents, stabilizing agents, colorants, ultra-violet (UV) absorbers or stabilizers, other flame retardants, compatibilizers, fillers and processing aids, are present in an amount from 0 wt %, or greater than 0 wt %, or 0.01 wt %, or 0.1 wt % to 1 wt %, or 2 wt %, or 3 wt %, or 5 wt %, or 10 wt %, based on the total weight of the composition.

Crosslinkable Composition

In an embodiment, the insulation or jacket layer is a reaction product of a crosslinkable composition comprising (A) a silane-functionalized polyolefin, (B) a filler comprising greater than 50 wt % silica, based on the total weight of the filler, (C) a silicone-containing polymer, and (D) 0.002 wt % to 20 wt % of a silanol condensation catalyst, based on the total weight of the crosslinkable composition.

In an embodiment, the silane-functionalized polyolefin is present in an amount from 10 wt %, or 20 wt %, or 30 wt %, or 40 wt %, or 50 wt % to 60 wt %, or 80 wt %, or 90 wt %, or 95 wt %, based on the total weight of the crosslinkable composition.

In an embodiment, the filler comprises greater than 50 wt % silica, based on the total weight of the filler and is present in an amount from 10 wt %, or 20 wt %, or 40 wt % to 50 wt %, or 60 wt %, or 70 wt %, or 80 wt %, or 90 wt %, based on the total weight of the crosslinkable composition.

In an embodiment, the filler comprises from 50 wt %, or 60 wt %, or 70 wt %, or 80 wt %, or 90 wt %, or 95 wt %, or 96 wt %, or 97 wt %, or 98 wt % to 99 wt %, or 99.1 wt %, or 99.2 wt %, or 99.3 wt %, or 99.4 wt %, or 99.5 wt %, or 99.6 wt %, or 99.7 wt %, or 99.8 wt %, or 99.9 wt %, or less than 100 wt %, or 100 wt % silica, based on the total weight of the filler.

In an embodiment, the crosslinkable composition is void of filler except for the silica filler.

In an embodiment, the silicone-containing polymer is present in an amount from greater than 2 wt %, or 3 wt %, or 4 wt %, or 4.25 wt %, or 4.5 wt %, or 4.75 wt % to 5 wt %, or 5.5 wt %, or 6 wt %, or 7 wt %, or 8 wt %, or 9 wt %, or 10 wt %, or 15 wt %, or 20 wt %, based on the total weight of the crosslinkable composition.

In an embodiment, the silanol condensation catalyst is present in an amount from 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, or 15 wt %, or 20 wt %, based on the total weight of the crosslinkable composition.

In an embodiment, a metal deactivator is present in an amount from 0 wt %, or greater than 0 wt %, or 0.01 wt %, or 0.02 wt %, or 0.03 wt %, or 0.04 wt %, or 0.05 wt %, or 0.1 wt %, or 0.5 wt %, or 1 wt %, or 2 wt %, or 3 wt % to 5 wt %, or 6 wt %, or 7 wt %, or 8 wt %, or 9 wt % or 10 wt %, based on the total weight of the crosslinkable composition.

In an embodiment, a moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt %, or 0.2 wt % to 0.3 wt %, or to 0.5 wt %, or to 0.75 wt %, or to 1.0 wt %, or to 1.5 wt %, or to 2.0 wt %, or to 3.0 wt %, based on the total weight of the crosslinkable composition.

In an embodiment, an antioxidant is present in an amount from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1 wt %, or 2 wt %, based on the total weight of the crosslinkable composition.

In an embodiment, one or more additives, e.g., anti-blocking agents, stabilizing agents, colorants, UV-absorbers or stabilizers, other flame retardants, compatibilizers, fillers and processing aids, is present in an amount from 0 wt %, or greater than 0 wt %, or 0.01 wt %, or 0.1 wt % to 1 wt %, or 2 wt %, or 3 wt % or 5 wt %, or 10 wt %, based on the total weight of the crosslinkable composition.

In an embodiment, the crosslinkable composition is metal-free. The metal-free crosslinkable composition contains from 0 wt %, or greater than 0 wt %, or 0.05 wt %, or 0.1 wt % to 0.15 wt %, or 0.2 wt %, or 0.3 wt %, or 0.4 wt %, or 0.5 wt % metals, based on the total weight of the crosslinkable composition. As used herein, "metals" includes all elements listed as metals in the Periodic Table of Elements, including Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, La, Hf, Ta, W, Re, Os, Ir, Pt, Au, Hg, Tl, Pb, Bi, Po, Fr, Ra, Ac, Rf, db, Sg, Bh, Hs, Mt, Ds, Rg, and Cn, as well as the lanthanides and actinides.

The crosslinkable composition can be prepared by dry blending or melt blending the individual components and additives. The melt blend can be pelletized for future use or immediately transferred to an extruder to form an insulation or jacket layer and/or coated conductor. For convenience, certain ingredients may be premixed, such as by melt processing or into masterbatches.

In an embodiment, the crosslinkable composition is moisture-curable.

The crosslinkable composition can comprise two or more embodiments disclosed herein.

Insulation or Jacket Layer

In an embodiment, the crosslinkable composition is used to form a jacket layer. In an embodiment, the jacket layer is an insulation layer.

The process for producing an insulation or jacket layer includes heating the crosslinkable composition to at least the melting temperature of the silane-functionalized polyolefin and then extruding the polymer melt blend onto a conductor. The term "onto" includes direct contact or indirect contact between the melt blend and the conductor. The melt blend is in an extrudable state.

The insulation or jacket layer is crosslinked. In an embodiment, the crosslinking begins in the extruder, but only to a minimal extent. In another embodiment, crosslinking is delayed until the composition is cured by exposure to moisture ("moisture curing").

As used herein, "moisture curing" is the hydrolysis of hydrolysable groups by exposure of the silane-functionalized polyolefin to water, yielding silanol groups which then undergo condensation (with the help of the silanol condensation catalyst) to form silane linkages. The silane linkages couple, or otherwise crosslink, polymer chains to produce the silane-coupled polyolefin. A schematic representation of the moisture curing reaction is provided in reaction (V) below.

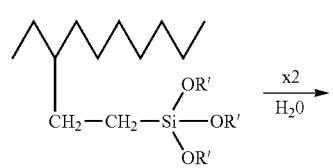

(V)

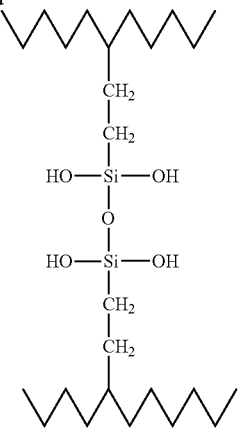

R' is a hydrocarbyl group

In an embodiment, the moisture is water. In an embodiment, the moisture curing is conducted by exposing the insulation or jacket layer or coated conductor to water in the form of humidity (e.g., water in the gaseous state or steam) or submerging the insulation or jacket layer or coated conductor in a water bath. Relative humidity can be as high as 100%.

In an embodiment, the moisture curing takes place at a temperature from room temperature (ambient conditions) to up to 100° C. for a duration from 1 hour, or 4 hours, or 12 hours, or 24 hours, or 3 days, or 5 days to 6 days, or 8 days, or 10 days, or 12 days, or 14 days, or 28 days, or 60 days.

In an embodiment, the disclosure provides an insulation or jacket layer for a coated conductor comprising (A) a crosslinked silane-functionalized polyolefin, (B) a filler comprising greater than 50 wt % silica, based on the total weight of the filler, (C) a silicone-containing polymer, and (D) from 0.00 wt % to 20 wt % of a silanol condensation catalyst based on the total weight of the insulation or jacket layer.

In an embodiment, the silane-functionalized polyolefin is present in an amount from 10 wt %, or 20 wt %, or 30%, or 40 wt %, or 50 wt % to 60 wt %, or 80 wt %, or 90 wt %, or 95%, based on the total weight of the insulation or jacket layer.

In an embodiment, the filler comprises greater than 50 wt % silica, based on the total weight of the filler, and is present in an amount from 10 wt %, or 20 wt %, or 40 wt % to 50 wt %, or 60 wt %, or 70 wt %, or 80 wt %, or 90 wt %, based on the total weight of the insulation or jacket layer.

In an embodiment, the filler comprises from 50 wt %, or 60 wt %, or 70 wt %, or 80 wt %, or 90 wt %, or 95 wt %, or 96 wt %, or 97 wt %, or 98 wt % to 99 wt %, or 99.1 wt %, or 99.2 wt %, or 99.3 wt %, or 99.4 wt %, or 99.5 wt %, or 99.6 wt %, or 99.7 wt %, or 99.8 wt %, or 99.9 wt %, or less than 100 wt %, or 100 wt % silica, based on the total weight of the filler.

In an embodiment, the insulation or jacket layer contains silica as the sole filler. Silica is the only filler to the exclusion of other fillers.

In an embodiment, the silicone-containing polymer is present in an amount from greater than 2 wt %, or 3 wt %, or 4 wt %, or 4.25 wt %, or 4.5 wt %, or 4.75 wt % to 5 wt %, or 5.5 wt %, or 6 wt %, or 7 wt %, or 8 wt %, or 9 wt %, or 10 wt %, or 15 wt %, or 20 wt %, based on the total weight of the insulation or jacket layer In an embodiment, the silanol condensation catalyst is present in an amount from 0.00 wt %, or 0.001 wt %, or 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, or 15 wt %, or 20 wt %, based on the total weight of the of the insulation or jacket layer.

In an embodiment, a metal deactivator is present in an amount from 0 wt %, or greater than 0 wt %, or 0.01 wt %, or 0.02 wt %, or 0.03 wt %, or 0.04 wt %, or 0.05 wt %, or 0.1 wt %, or 0.5 wt %, or 1 wt %, or 2 wt %, or 3 wt % to 5 wt %, or 6 wt %, or 7 wt %, or 8 wt %, or 9 wt %, or 10 wt %, based on the total weight of the insulation or jacket layer.

In an embodiment, a moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt %, or 0.2 wt % to 0.3 wt %, or to 0.5 wt %, or to 0.75 wt %, or to 1.0 wt %, or to 1.5 wt %, or to 2.0 wt %, or to 3.0 wt %, based on the total weight of the insulation or jacket layer.

In an embodiment, an antioxidant is present in an amount from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1 wt %, or 2 wt %, based on the total weight of the insulation or jacket layer.

In an embodiment, one or more additives, e.g., anti-blocking agents, stabilizing agents, colorants, UV-absorbers or stabilizers, other flame retardants, compatibilizers, fillers and processing aids, is present in an amount from 0 wt %, or greater than 0 wt %, or 0.01 wt %, or 0.1 wt % to 1 wt %, or 2 wt %, or 3 wt %, or 5 wt %, or 10 wt %, based on the total weight of the insulation or jacket layer.

In an embodiment, the insulation or jacket layer includes silica as the sole filler (silica being present to the exclusion of all other fillers), and the insulation or jacket layer is metal-free. The metal-free insulation or jacket layer contains from 0 wt %, or greater than 0 wt %, or 0.05 wt %, or 0.1 wt % to 0.15 wt %, or 0.2 wt %, or 0.3 wt %, or 0.4 wt %, or 0.5 wt % metals, based on the total weight of the insulation or jacket layer. As used herein, "metals" includes all elements listed as metals in the Periodic Table of Elements, including Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, La, Hf, Ta, W, Re, Os, Ir, Pt, Au, Hg, Tl, Pb, Bi, Po, Fr, Ra, Ac, Rf, db, Sg, Bh, Hs, Mt, Ds, Rg, and Cn, as well as the lanthanides and actinides.

In an embodiment, the insulation or jacket layer has a thickness from 5 mil, or from 10 mil, or from 15 mil, or from 20 mil, to 25 mil, or 30 mil, or 35 mil, or 40 mil, or 50 mil, or 75 mil, or 100 mil.

In an embodiment, the insulation or jacket layer passes the horizontal burn test as defined in Horizontal Flame UL 2556. To pass the horizontal burn test, the insulation or jacket layer must have a total char of less than 100 mm. In an embodiment, the insulation or jacket layer has a total char during the horizontal burn test from 20 mm, or 25 mm, or 30 mm to 50 mm, or 55 mm, or 60 mm, or 70 mm, or 75 mm, or 80 mm, or 90 mm, or less than 100 mm.

In an embodiment, the insulation or jacket layer has a wet insulation resistance ratio from 1.10, or 1.15, or 1.20, or 1.25 to 1.30, or 1.35, or 1.40, or 1.45, or 1.50, or 1.55, or 1.60, or 1.70.

In an embodiment, the insulation or jacket layer has a wet insulation resistance ratio from 1.10, or 1.15, or 1.20, or 1.25 to 1.30, or 1.35, or 1.40, or 1.45, or 1.50, or 1.55, or 1.60, or 1.70 and passes the horizontal burn test.

Insulation or Jacket Layer 1: In an embodiment, the insulation or jacket layer comprises: (A) from 40 wt %, or 45 wt %, or 47 wt %, or 50 wt % to 52 wt %, or 55 wt %, or 60 wt % based on the total weight of the insulation or jacket layer, of a silane-grafted polyethylene; (B) from 40 wt %, or 42 wt %, or 45 wt % to 50 wt %, or 52 wt %, or 55 wt %, or 60 wt %, based on the total weight of the insulation or jacket layer, filler comprising greater than 50 wt % silica, based on the total weight of the filler; (C) from 4.75 wt %, or 4.8 wt %, or 4.9 wt %, or 5 wt % to 5.1 wt %, or 5.2 wt %, or 5.3 wt %, based on the total weight of the insulation or jacket layer, of a silicone-containing polymer; and (D) from 0.00 wt %, or 0.001 wt %, or 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, based on the total weight of the insulation or jacket layer, of a silanol condensation catalyst.

Insulation or Jacket Layer 2: In an embodiment, the insulation or jacket layer comprises (A) from 40 wt %, or 45 wt %, or 47 wt %, or 50 wt % to 52 wt %, or 55 wt %, or 60 wt %, based on the total weight of the insulation or jacket layer, of a silane-grafted polyethylene; (B) from 40 wt %, or 42 wt %, or 45 wt % to 50 wt %, or 52 wt %, or 55 wt %, or 60 wt %, based on the total weight of the insulation or jacket layer, silica filler, wherein the silica filler is the sole filler to the exclusion of other fillers; and (C) from 4.75 wt %, or 4.8 wt %, or 4.9 wt %, or 5 wt % to 5.1 wt %, or 5.2 wt %, or 5.3 wt % based on the total weight of the insulation or jacket layer, of a silicone-containing polymer; and from 0.00 wt %, or 0.001 wt %, or 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, based on the total weight of the insulation or jacket layer, of a silanol condensation catalyst.

In an embodiment, the insulation layer is according to Insulation or Jacket Layer 1 or Insulation or Jacket Layer 2 having one, some, or all of the following properties:
  (i) is metal-free; and/or
  (ii) a wet insulation resistance ratio from greater than or equal to 1.10 ohms, or 1.15 ohms, or 1.20 ohms, or 1.25 ohms to 1.30 ohms, or 1.35 ohms, or 1.40 ohms, or 1.45 ohms, or 1.50 ohms, or 1.55 ohms; and/or
  (iii) passes the horizontal burn test.

In an embodiment, the insulation or jacket layer has at least 2, or all 3 of properties (i)-(iii).

In an embodiment, the insulation or jacket layer is according to Insulation or Jacket Layer 1 or Insulation or Jacket Layer 2, wherein the silicone-containing polymer is a reactive linear polysiloxane, and wherein the insulation or jacket layer has one, some, or all of the following properties:
  (i) is metal-free; and/or
  (ii) a wet insulation resistance ratio from greater than or equal to 1.10, or 1.15, or 1.20, or 1.25 to 1.30, or 1.35, or 1.40, or 1.45, or 1.50, or 1.55; and/or
  (iii) passes the horizontal burn test.

In an embodiment, the insulation or jacket layer has at least 2, or all 3 of properties (i)-(iii).

In an embodiment, the insulation or jacket layer is according to Insulation or Jacket Layer 1 or Insulation or Jacket Layer 2, wherein the silicone-containing polymer is a non-reactive linear polysiloxane, and wherein the insulation or jacket layer has one, some, or all of the following properties:
  (i) is metal-free; and/or
  (ii) a wet insulation resistance ratio from greater than or equal to 1.10, or 1.15, or 1.20, or 1.25 to 1.30, or 1.35, or 1.40, or 1.45, or 1.50, or 1.55; and/or
  (iii) passes the horizontal burn test.

In an embodiment, the insulation or jacket layer has at least 2, or all 3 of properties (i)-(iii).

In an embodiment, the insulation or jacket layer is according to Insulation or Jacket Layer 1 or Insulation or Jacket Layer 2, wherein the silicone-containing polymer is a non-reactive branched polysiloxane, and wherein the insulation or jacket layer has one, some, or all of the following properties:
  (i) is metal-free; and/or
  (ii) a wet insulation resistance ratio from greater than or equal to 1.10, or 1.15, or 1.20, or 1.25 to 1.30, or 1.35, or 1.40, or 1.45, or 1.50, or 1.55; and/or
  (iii) passes the horizontal burn test.

In an embodiment, the insulation or jacket layer has at least 2, or all 3 of properties (i)-(iii).

Although silica does not decompose at elevated temperatures to release gas, it was surprisingly discovered that the insulation or jacket layer passes the horizontal burn test. Not to be bound by any particular theory, it is believed that the silica and silicone-containing polymer display an unexpected synergy. The silicone-containing polymer decomposes at elevated temperatures, forming an inorganic char which binds the silica particles. Further, it was surprisingly discovered that the insulation or jacket layer has improved wet insulation resistance. Not to be bound by any particularly theory, it is believed that the surface of the silica particles interacts with the silane-functionalized polyolefin, resulting in better distribution of the silica particles being more discrete and better dispersed in the silane-functionalized polyolefin matrix. When silica particles are in contact with one another, there is the potential for water to break through the silica interface. However, when the particles are not in contact with one another, it is more difficult for water to penetrate the interface.

The insulation or jacket layer may comprise two or more embodiments disclosed herein.

Coated Conductor

In an embodiment, the disclosure provides a coated conductor comprising a coating on the conductor, the coating comprising (A) a crosslinked silane-functionalized polyolefin, (B) a filler comprising greater than 50 wt % silica, based on the total weight of the filler, (C) a silicone-containing polymer, and (D) from 0.00 wt % to 20 wt %, based on the total weight of the coating, of a silanol condensation catalyst.

The process for producing the coated conductor includes heating the crosslinkable composition to at least the melting temperature of the silane-functionalized polyolefin and then extruding the polymer melt onto the conductor. The term "onto" includes direct contact or indirect contact between the melt blend and the conductor. The melt blend is in an extrudable state.

The coating is crosslinked. In an embodiment, the crosslinking begins in the extruder, but only to a minimal extent.

In another embodiment, crosslinking is delayed until the composition is cured by exposure to moisture ("moisture curing").

In an embodiment, the moisture is water. In an embodiment, the moisture curing is conducted by exposing the coated conductor to water in the form of humidity (e.g., water in the gaseous state) or submerging the insulation or jacket layer or coated conductor in a water bath. Relative humidity can be as high as 100%.

In an embodiment, the moisture curing takes place at a temperature from room temperature (ambient conditions) up to 100° C. for a duration from 1 hour, or 4 hours, or 12 hours, or 24 hours, or 2 days, or 3 days, or 5 days to 6 days, or 8 day, or 10 days, or 12 days, or 14 days, or 28 days, or 60 days.

In an embodiment, the silane-functionalized polyolefin is present in an amount from 10 wt %, or 20 wt %, or 30 wt %, or 40 wt %, or 50 wt % to 60 wt %, or 80 wt %, or 90 wt %, or 95 wt %, based on the total weight of the coating.

In an embodiment, the filler comprises greater than 50 wt % silica, based on the total weight of the filler, and is present in an amount from 10 wt %, or 20 wt %, or 40 wt % to 50 wt %, or 60 wt %, or 70 wt %, or 80 wt %, or 90 wt %, based on the total weight of the crosslinkable composition.

In an embodiment, the filler comprises from 50 wt %, or 60 wt %, or 70 wt %, or 80 wt %, or 90 wt %, or 95 wt %, or 96 wt %, or 97 wt %, or 98 wt % to 99 wt %, or 99.1 wt %, or 99.2 wt %, or 99.3 wt %, or 99.4 wt %, or 99.5 wt %, or 99.6 wt %, or 99.7 wt %, or 99.8 wt %, or 99.9 wt %, or less than 100 wt %, or 100 wt % silica, based on the total weight of the filler.

In an embodiment, the coating contains silica as the sole filler. Silica is the only filler to the exclusion of other fillers.

In an embodiment, the silicone-containing polymer is present in an amount from greater than 2 wt %, or 3 wt %, or 4 wt %, or 4.25 wt %, or 4.5 wt %, or 4.75 wt % to 5 wt %, or 5.5 wt %, or 6 wt %, or 7 wt %, or 8 wt %, or 9 wt %, or 10 wt %, or 15 wt %, or 20 wt % based on the total weight of the coating.

In an embodiment, the silanol condensation catalyst is present in an amount from 0.00 wt %, or 0.001 wt %, or 0.002 wt %, or 0.005 wt %, or 0.01 wt %, or 0.02 wt %, or 0.05 wt %, or 0.08 wt %, or 0.1 wt %, or 0.15 wt %, or 0.2 wt %, or 0.3 wt %, or 0.4 wt %, or 0.5 wt %, or 0.6 wt %, or 0.8 wt %, or 1.0 wt % to 1.5 wt %, or 2 wt %, or 4 wt %, or 5 wt %, or 6 wt %, or 8 wt %, or 10 wt %, or 15 wt %, or 20 wt %, based the total weight of the coating.

In an embodiment, a metal deactivator is present in an amount from 0 wt %, or greater than 0 wt %, or 0.01 wt %, or 0.02 wt %, or 0.03 wt %, or 0.04 wt %, or 0.05 wt %, or 0.1 wt %, or 0.5 wt %, or 1 wt %, or 2 wt %, or 3 wt % to 5 wt %, or 6 wt %, or 7 wt %, or 8 wt %, or 9 wt % or 10 wt %, based on the total weight of the coating.

In an embodiment, a moisture scavenger is present in an amount from 0 wt %, or greater than 0 wt %, or 0.01 wt %, or 0.02 wt %, or 0.03 wt %, or 0.04 wt %, or 0.05 wt %, or 0.1 wt %, or 0.2 wt % to 0.3 wt %, or to 0.5 wt %, or to 0.75 wt %, or to 1.0 wt %, or to 1.5 wt %, or to 2.0 wt %, or to 3.0 wt %, based on the total weight of the coating.

In an embodiment, an antioxidant is present in an amount from 0 wt %, or greater than 0 wt %, or 0.01 wt %, or 0.02 wt %, or 0.03 wt %, or 0.04 wt %, or 0.05 wt %, or 0.06 wt %, or 0.07 wt %, or 0.08 wt %, or 0.09 wt %, or 0.1 wt % to 0.12 wt %, or 0.14 wt %, or 0.16 wt %, or 0.18 wt %, or 0.2 wt %, or 0.25 wt %, or 0.3 wt %, or 0.5 wt %, or 1.0 wt %, or 2.0 wt % based on the total weight of the coating.

In an embodiment, one or more additives, e.g., antiblocking agents, stabilizing agents, colorants, UV-absorbers or stabilizers, flame retardants, compatibilizers, fillers and processing aids, is present in an amount from 0 wt %, or greater than 0 wt %, or 0.01 wt %, or 0.1 wt % to 1 wt %, or 2 wt %, or 3 wt % based on the total weight of the coating.

In an embodiment, the coating is metal-free. As used herein, the term "metal-free" means containing from 0 wt %, or greater than 0 wt %, or 0.05 wt %, or 0.1 wt % to 0.15 wt %, or 0.2 wt %, or 0.3 wt %, or 0.4 wt %, or 0.5 wt % metals, based on the total weight of the coating. As used herein, "metals" includes all elements listed as metals in the Periodic Table of Elements, including Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, La, Hf, Ta, W, Re, Os, Ir, Pt, Au, Hg, Tl, Pb, Bi, Po, Fr, Ra, Ac, Rf, db, Sg, Bh, Hs, Mt, Ds, Rg, and Cn, as well as the lanthanides and actinides.

The coating may be one or more inner layers. The coating may wholly or partially cover or otherwise surround or encase the conductor. The coating may be the sole component surrounding the conductor. Alternatively, the coating may be one layer of a multilayer jacket or sheath encasing the conductor. In an embodiment, the coating directly contacts the conductor. In another embodiment, the coating directly contacts an intermediate layer surrounding the conductor.

In an embodiment, the coating has a thickness from 5 mil, or from 10 mil, or from 15 mil, or from 20 mil, to 25 mil, or 30 mil, or 35 mil, or 40 mil, or 50 mil, or 75 mil, or 100 mil.

In an embodiment, the coated conductor has a wet insulation resistance ratio of greater than or equal to 1.00, or greater than 1.10, or greater than 1.20.

In an embodiment, the coated conductor has a wet insulation resistance ratio from greater than or equal to 1.00, or 1.05, or 1.10, or 1.15, or 1.20, or 1.25 to 1.30, or 1.35, or 1.40, or 1.45, or 1.50, or 1.55, or 1.60, or 1.70.

In an embodiment, the coated conductor passes the horizontal burn test. To pass the horizontal burn test, the coating must have a total char of less than 100 mm. In an embodiment, the coated conductor has a total char during the horizontal burn test from 0 mm, or 5 mm, or 10 mm to 50 mm, or 55 mm, or 60 mm, or 70 mm, or 75 mm, or 80 mm, or 90 mm, or less than 100 mm.

In an embodiment, the coating on the coated conductor is according to Insulation or Jacket Layer 1 or Insulation or Jacket Layer 2, wherein the coated conductor has one, some, or all of the following properties:
  (i) the coating is metal-free; and/or
  (ii) a wet insulation resistance ratio from greater than or equal to 1.10, or 1.15, or 1.20, or 1.25 to 1.30, or 1.35, or 1.40, or 1.45, or 1.50, or 1.55; and/or
  (iii) the coated conductor passes the horizontal burn test.
In an embodiment, the coated conductor has at least 2, or all 3 of properties (i)-(iii).

In an embodiment, the coating on the coated conductor is according to Insulation or Jacket Layer 1 or Insulation or Jacket Layer 2, wherein the silicone-containing polymer is a reactive linear polysiloxane and the coated conductor has one, some, or all of the following properties:
  (i) the coating is metal-free; and/o
  (ii) a wet insulation resistance ratio from greater than or equal to 1.10, or 1.15, or 1.20, or 1.25 to 1.30, or 1.35, or 1.40, or 1.45, or 1.50, or 1.55; and/or
  (iii) the coated conductor passes the horizontal burn test.

In an embodiment, the coated conductor has at least 2, or all 3 of properties (i)-(iii).

In an embodiment, the coating on the coated conductor is according to Insulation or Jacket Layer 1 or Insulation or Jacket Layer 2, wherein the silicone-containing polymer is a non-reactive linear polysiloxane and the coated conductor has one, some, or all of the following properties:
  (i) the coating is metal-free; and/or
  (ii) a wet insulation resistance ratio from greater than or equal to 1.10, or 1.15, or 1.20, or 1.25 to 1.30, or 1.35, or 1.40, or 1.45, or 1.50, or 1.55; and/or
  (iii) the coated conductor passes the horizontal burn test,
In an embodiment, the coated conductor has at least 2, or all 3 of properties (i)-(iii).

In an embodiment, the coating on the coated conductor is according to Insulation or Jacket Layer 1 or Insulation or Jacket Layer 2, wherein the silicone-containing polymer is a non-reactive branched polysiloxane and the coated conductor has one, some, or all of the following properties:
  (i) the coating is metal-free; and/or
  (ii) a wet insulation resistance ratio from greater than or equal to 1.10, or 1.15, or 1.20, or 1.25 to 1.30, or 1.35, or 1.40, or 1.45, or 1.50, or 1.55; and/or
  (iii) the coated conductor passes the horizontal burn test.
In an embodiment, the coated conductor has at least 2, or all 3 of properties (i)-(iii).

In an embodiment, the coating is a jacket layer. In an embodiment, the jacket layer is an insulation layer.

The coated conductor may comprise two or more embodiments disclosed herein.

Some embodiments of the present disclosure will now be described in detail in the following examples.

EXAMPLES

Materials

ENGAGE 8402 is an ethylene-octene copolymer having a density of 0.902 g/cc and a MI of 30 g/10 min.

VTMS is a vinyltrimethoxysilane having a density of 0.968 g/mL at 25° C. and a boiling point 123° C.

Luperox 101 is a 2,5-bis(tert-butylperoxy)-2,5-dimethylhexane grafting initiator.

Filler 1 is Min-U-Sil 5, a crystalline silica filler having a D90 of 5 micron and a purity of 99.4%.

Filler 2 is Huber Zerogen 100SV, a magnesium hydroxide surface treated filler with a median particle size of 0.8 µm.

Filler 3 is Kisuma 5J, a magnesium hydroxide surface treated filler with an average particle size of 0.8-1.2 µm.

Filler 4 is Huber Q1, a calcium carbonate filler with no surface treatment and a median particle size of 1.1 µm.

Filler 5 is Huber Q1T, a calcium carbonate, surface treated filler with a median particle size of 1.1 µm.

Filler 6 is OMYACARB® 10, a calcium carbonate with no surface treatment and a median particle size of 12 µm.

AO is Irganox 1010 (antioxidant).

Silicone-Containing Polymer 1 (SCP1) is XIAMETER® PMX-200 (1M cSt), a non-reactive linear polydimethylsiloxane (dimethyl siloxane, trimethylsiloxy-terminated) with a specific gravity of 0.978 at 25° C. and a kinematic viscosity of 1,000,000 Centistokes.

SCP2 is XIAMETER® PMX-200 (60k cSt), a non-reactive linear polydimethylsiloxane (dimethyl siloxane, trimethylsiloxy-terminated) with a specific gravity of 0.978 at 25° C. and a kinematic viscosity of 60,000 Centistokes.

SCP3 is XIAMETER® OHX-4000, a reactive linear polydimethylsiloxane with terminal silanol groups (dimethyl siloxane, hydroxy-terminated) having a density of 0.972 g/cc and a dynamic viscosity of 2,000 mPa·s.

The metal deactivator (MD) is oxalyl bis (benzylidene) hydroxide.

The moisture scavenger (MS) is hexadecyltrimethoxysilane.

ENGAGE 8450 is an ethylene/octene copolymer having a density of 0.902 g/cc and a MI of 3.0 g/10 min.

DFH-2065 is a linear low density polyethylene, having a melt index of 0.65 grams/10 minutes and a density of 0.920 g/cc, available from The Dow Chemical Company DFDA-1216 NT is a low density polyethylene (LDPE) with a density of 0.92 g/cc and a melt index of 2.3 g/10 min, available from The Dow Chemical Company Dibutyltin dilaurate is the silanol condensation catalyst.

1,2-bis(3,5-di-tert-butyl-4-hydroxyhydrocinnamoyl)hydrazine is an antioxidant.

Tetrakis(methylene(3,5-di-tert-butyl-4-hydroxyhydrocinnamate))methane is a stabilizer.

Sample Preparation

A silane-grafted polyethylene is prepared by reactive extrusion through a twin-screw extruder. 1.8 wt %, based on the total weight of base resin (ENGAGE 8402), of vinyltrimethoxysilane (VTMS) and 900 ppm based on the total weight of the base resin (ENGAGE 8402) of Luperox 101 are weighed and mixed together followed by approximately 10 to 15 minutes of magnetic stirring to achieve a uniform liquid mixture. The mixture is placed on a scale and connected to a liquid pump injection. ENGAGE 8402 is fed into the main feeder of the ZSK-30 extruder. The barrel temperature profile of the ZSK-30 is set as follows:

| | |
|---|---|
| 2-3 | 160° C. |
| 4-5 | 195° C. |
| 6-7 | 225° C. |
| 8-9 | 225° C. |
| 10-11 | 170° C. | with a pellet water temperature as near to 10° C. (50° F.) as possible and a chiller water temperature as near to 4° C. (40° C.) as possible.

The amount of VTMS grafted to the polyethylene is determined by infrared spectroscopy. Spectra are measured with a Nicolet 6700 FTIR instrument. The absolute value is measured by FTIR mode without the interference from surface contamination. The ratio of the absorbances at 1192 $cm^{-1}$ and 2019 $cm^{-1}$ (internal thicknesses) is determined. The ratio of the 1192/2019 peak heights is compared to standards with known levels of VTMS in DFDA-5451 (available as SI-LINK 5451 from the Dow Chemical Company). Results show that the grafted VTMS content of the silane-grafted polyethylene (Si-g-PE) is about 1.7 mass % based on the total mass of the polymer.

The Si-g-PE is added into a Brabender at around 140° C. and the silica filler, silicone-containing polymer, metal deactivator, moisture scavenger, and the antioxidant Irganox 1010 are added into the bowl after the Si-g-PE is melted in amounts as specified in Tables 1 and 3, below. The mixture is mixed for about 5 minutes.

The mixture is then pelletized into small pieces for wire extrusion. In the extrusion step, the silanol condensation catalyst, in the form of a masterbatch as set forth in Table 2, below, is added with the pelletized mixture to extrude the wire on copper wire of 0.064 in diameter. The wall thickness is set around 30 mil and the extrusion temperature is from 140° C. to a head temperature of 165° C. The concentration of silanol condensation catalyst in the overall composition is in the range of 0.01 wt % to 0.5 wt %.

The extruded wires are cured in a 90° C. water bath overnight and the cured wires are cut into 15 feet (4.572 meter) long segments. The wet IR of the 10 feet long segments that are immersed in water is recorded and the wet IR ratio recorded, if applicable.

The horizontal burn test is applied to the extruded wires according to UL-2556 A burner is set at a 20° angle relative to horizontal of the sample (14 AWG copper wire with 30 mil wall thickness). A one-time flame is applied to the middle of the specimen for 30 seconds. The sample fails when either the cotton ignites (reported in seconds) or the samples char in excess of 100 mm. The burner is set at 20° angle to horizontal of the sample. Failure occurs when either cotton ignites or samples char in excess of 100 mm (UL 1581, 1100.4)

TABLE 1

Comparative and Inventive Examples

| | Component (wt %) | CS1 | IE1 | CS2 | IE2 | CS3 | IE3 | IE4 | IE5 |
|---|---|---|---|---|---|---|---|---|---|
| | Si-g-PE | 50.39 | 48.60 | 49.11 | 49.11 | 50.90 | 52.96 | 43.56 | 47.83 |
| Silica Filler | Filler 1 | 49.36 | 46.04 | 49.11 | 45.02 | 45.25 | 41.14 | 49.49 | 45.35 |
| Filler Other Than Silica | Filler 2 | | | | | | | | |
| | Filler 3 | | | | | | | | |
| | Filler 4 | | | | | | | | |
| | Filler 5 | | | | | | | | |
| | Filler 6 | | | | | | | | |
| | AO | 0.21 | 0.21 | 0.21 | 0.21 | 0.21 | 0.21 | 0.21 | 0.21 |
| Silicone-Containing Polymer | SCP1 | 0.00 | 5.11 | 0.00 | 5.11 | | | | |
| | SCP2 | | | | | 3.09 | 5.14 | 5.16 | |
| | SCP3 | | | | | | | | 5.15 |
| | MD | 0.04 | 0.04 | 0.04 | 0.04 | 0.04 | 0.04 | 0.04 | 0.04 |
| | MS | 0.00 | 0.00 | 1.53 | 0.51 | 0.51 | 0.51 | 0.51 | 0.39 |
| Total Before Extrusion | | 100.00 | 100.00 | 100.00 | 100.00 | 100.00 | 100.00 | 100.00 | 100.00 |
| | MB (Table 2) | +3.00 | +3.00 | +3.00 | +3.00 | +3.00 | +3.00 | +3.00 | +3.00 |
| Total After Extrusion | | 103.00 | 103.00 | 103.00 | 103.00 | 103.00 | 103.00 | 103.00 | 103.00 |
| | Wet Insulation Resistance Ratio | 1.07 | 1.52 | 1.00 | 1.23 | not tested | not tested | not tested | not tested |

TABLE 1-continued

Comparative and Inventive Examples

| Horizontal Burn (char length, mm) | | Fail (>100) | Pass (<50) | Fail (>100) | Pass (83) | Fail (>100) | Pass (S3) | Pass (86) | Pass (59) |
|---|---|---|---|---|---|---|---|---|---|
| | Component (wt %) | CS4 | CS5 | CS6 | CS7 | CS8 | CS9 | CS10 | CS11 |
| Silica Filler | Si-g-PE Filler 1 | 50.39 | 50.39 | 50.39 | 50.39 | 50.39 | 46.28 | 46.28 | 50.76 |
| Filler Other Than Silica | Filler 2 | 49.36 | | | | | | | |
| | Filler 3 | | 49.36 | | | | | | 44.00 |
| | Filler 4 | | | 49.36 | | | 49.36 | | |
| | Filler 5 | | | | 49.36 | | | 49.36 | |
| | Filler 6 | | | | | 49.36 | | | |
| | AO | 0.21 | 0.21 | 0.21 | 0.21 | 0.21 | 0.21 | 0.21 | 0.20 |
| Silicone-Containing Polymer | SCP1 | | | | | | 4.11 | 4.11 | 5.00 |
| | SCP2 | | | | | | | | |
| | SCP3 | | | | | | | | |
| | MD | 0.04 | 0.04 | 0.04 | 0.04 | 0.04 | 0.04 | 0.04 | 0.04 |
| | MS | | | | | | | | |
| Total Before Extrusion | | 100.00 | 100.00 | 100.00 | 100.00 | 100.00 | 100.00 | 100.00 | 100.00 |
| | MB (Table 2) | +3.00 | +3.00 | +3.00 | +3.00 | +3.00 | +3.00 | +3.00 | +3.00 |
| Total After Extrusion | | 103.00 | 103.00 | 103.00 | 103.00 | 103.00 | 103.00 | 103.00 | 103.00 |
| | Wet Insulation Resistance Ratio | 0.16 | 0.70 | Fail* | Fail* | Fail* | Fail* | Fail* | 0.96 |
| | Horizontal Burn (char length, mm) | not tested | not tested | not tested | not tested | not tested | not tested | not tested | not tested |

CS = comparative sample
IE = inventive example
*fail = before week 10-12, the average resistance was measured below 1000 MOhms and the decay for consecutive weeks is larger than 4%

TABLE 2

| Catalyst Masterbatch | |
|---|---|
| ENGAGE 8450 | 80.00 wt % |
| DFH-2065 LLDPE | 17.14 wt % |
| DFDA-1216 NT | 1.34 wt % |
| 1,2-bis(3,5-di-tert-butyl-4-hydroxyhydrocinnamoyl) hydrazine | 0.33 wt % |
| Tetrakis (methylene(3,5-di-tert-butyl-4-hydroxyhydrocinnamate)) methane | 0.67 wt % |
| Dibutyltin dilaurate | 0.52 wt % |
| Total: | 100.00 wt % |

Inventive Examples 1-2 show flame retardancy (i.e., each passes the horizontal burn test) and each also has a wet IR of greater than 1.10 ohms. In comparison, Comparative Samples 1 and 2, which contain a silica filler without a silicone-based polymer, have a wet IR of greater than 1.00 ohms but fail the horizontal burn test. Comparative Samples 3 contains less than 5 wt % of the silicone-based polymer and fails the horizontal burn test. Comparative Samples 4-11 contain a filler other than silica and have a wet IR of less than 1.10 ohms.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A crosslinkable composition comprising:
   (A) a silane-functionalized polyolefin;
   (B) a filler comprising greater than 50 wt % silica, based on the total weight of the filler, the silica having a median particle size (D50) from 0.01 um to 50 um;
   (C) a silicone-containing polymer selected from the group consisting of non-reactive linear silicone-containing polymers and non-reactive branched silicone-containing polymer; and
   (D) from 0.00 wt % to 20 wt % of a silanol condensation catalyst, based on the total weight of the crosslinkable composition.

2. A jacket layer for a coated conductor, the jacket layer comprising:
   (A) a crosslinked silane-functionalized polyolefin;
   (B) a filler comprising greater than 50 wt % silica, based on the total weight of the filler, the silica having a median particle size (D50) from 0.01 um to 50 um;
   (C) a silicone-containing polymer selected from the group consisting of non-reactive linear silicone-containing polymers and non-reactive branched silicone-containing polymers; and
   (D) from 0.00 wt % to 10 wt % of a silanol condensation catalyst, based on the total weight of the jacket layer.

3. The jacket layer of claim 2, wherein the crosslinked silane-functionalized polyolefin is a silane-grafted ethylene-based polymer.

4. The jacket layer of claim 3, wherein the filler comprises greater than 90 wt % to 100 wt % silica, based on the total weight of the filler.

5. The jacket layer of claim 4, wherein the filler consists solely of silica.

6. The jacket layer of claim 2, wherein the silicone-containing polymer is a non-reactive linear polysiloxane.

7. The jacket layer of claim 2, comprising, based on total weight of the jacket layer,
(A) from 20 wt % to 80 wt % of the crosslinked silane-functionalized polyolefin, wherein the crosslinked silane-grafted polyolefin is a crosslinked silane-grafted polyethylene;
(B) from 20 wt % to 80 wt % of the filler; and
(C) from 4 wt % to 20 wt % of the silicone-containing polymer.

8. The jacket layer of claim 2, wherein the filler comprises from 0 wt % to 0.5 wt % metals, based on the total weight of the filler.

9. The jacket layer of claim 8, wherein the jacket layer comprises from 0 wt % to 0.3 wt % metals, based on the total weight of the filler.

10. The jacket layer of claim 2 comprising from greater than 2 wt % to 20 wt % of the silicone-containing polymer, based on the total weight of the jacket layer, the jacket layer having a wet insulation resistance ratio from 1.10 to 1.70.

11. The jacket layer of claim 10, wherein the jacket layer comprises from 4 wt % to 20 wt % of the silicone-containing polymer, based on the total weight of the jacket layer, and the jacket layer passes the horizontal burn test.

12. The jacket layer of claim 2, wherein the jacket layer further comprises at least one of a metal deactivator, a moisture scavenger, and an antioxidant.

13. The jacket layer of claim 2, wherein the jacket layer is an insulation layer.

14. A coated conductor comprising:
a conductor; and
a coating on the conductor, the coating comprising
(A) a crosslinked silane-functionalized polyolefin;
(B) a filler comprising greater than 50 wt % silica, based on the total weight of the filler, the silica having a median particle size (D50) from 0.01 um to 50 um;
(C) a silicone-containing polymer selected from the group consisting of non-reactive linear silicone-containing polymers or non-reactive branched silicone-containing polymers; and
(D) from 0.00 wt % to 20 wt % of a silanol condensation catalyst, based on the total weight of the coating.

15. The coated conductor of claim 14, wherein the coating comprises from 0 wt % to 0.3 wt % metals, based on the total weight of the filler.

16. The coated conductor of claim 15, wherein the coating comprises from greater than 2 wt % to 20 wt % of the silicone-containing polymer, based on the total weight of the coating layer; and the coated conductor has a wet insulation resistance ratio of 1.10 to 1.70.

17. The coated conductor of claim 16, wherein the coating comprises from 4 wt % to 20 wt % of the silicone-containing polymer, based on the total weight of the coating, and the coated conductor passes the horizontal burn test.

* * * * *